United States Patent [19]

Higson

[11] Patent Number: 4,703,944
[45] Date of Patent: Nov. 3, 1987

[54] BEACH CADDY

[76] Inventor: Michael E. Higson, 208 Eight Ave., N. Myrtle Beach, S.C. 29597

[21] Appl. No.: 887,700

[22] Filed: Jul. 21, 1986

[51] Int. Cl.⁴ .............................................. B62B 1/04
[52] U.S. Cl. ...................................... 280/30; 280/652; 280/655; 280/659; 280/47.18; 280/47.26; 280/47.29; 297/129; D6/335
[58] Field of Search ............... 280/652, 654, 655, 659, 280/30, 638, 639, 47.18, 47.24, 47.26, 47.27, 47.28, 47.29; 297/129, 331, 336, DIG. 4; D6/335

[56] References Cited

U.S. PATENT DOCUMENTS

| | | | |
|---|---|---|---|
| 2,806,708 | 9/1957 | Finstad | 280/655 |
| 2,840,142 | 6/1958 | Haug | 280/47.18 |
| 2,883,207 | 4/1959 | Reich | 280/47.26 |
| 3,677,571 | 7/1972 | Maturo, Jr. et al. | 280/654 |
| 3,693,993 | 9/1972 | Mazzarelli et al. | 280/30 |
| 3,758,128 | 9/1973 | Stenwall | 280/30 |
| 4,316,615 | 2/1982 | Willette | 280/47.26 |

FOREIGN PATENT DOCUMENTS 3425205  1/1986  Fed. Rep. of Germany ... 297/DIG. 4

Primary Examiner—John J. Love
Assistant Examiner—Eric D. Culbreth

[57] ABSTRACT

The disclosure shows a beach caddy comprising a vertical frame assembly, a hinged chair rack, a hinged platform and a hinged table leg frame. The vertical frame assembly consists of an upper and a lower section connected at two vertical members, rectangular in cross section, by hinges. Each of the vertical members increases in depth at its lower end to form a storage space in conjunction with a rear and front panel and an upper and lower cross-member, the upper cross-member having circular orifices of sufficient diameter to allow protrusion therethrough of the shafts of standard beach umbrellas and standard fishing poles. To the face of the vertical members of the frame are permanently affixed table panels each located approximately adjacent to and flush with the next for use, when the vertical frame assembly is deployed in a horizontal position, as a table. An axle with a wheel on each end is attached to the front of the rear panel by two axle brackets. The chair rack is attached by hinges to the front of the lower vertical frame assembly. The platform assembly, which comprises one or more platform panels, is attached by hinges to the front of the lower vertical frame assembly. The table leg frame is attached by hinges to the rear of the lower vertical frame assembly.

5 Claims, 4 Drawing Figures

BEACH CADDY

FIELD OF THE INVENTION

The present invention relates to a device for a beach caddy which converts from a caddy with wheels for carrying numerous items including chairs, coolers or ice chests, beach umbrellas and fishing poles, to a table which includes a holder for the umbrella, fishing poles, and standard beverage cans when encased in standard insulated sleeves and an out-of-sight storage space.

DESCRIPTION OF PRIOR ART

From the teachings of U.S. Pat. No. 3,677,571, a beach cart is known, which includes projecting portions for supporting a folding beach chair, as well as compartments for storing other beach articles such as umbrellas. Such prior art has the disadvantage of serving the sole purpose of transporting articles to the beach without providing additional uses at the beach itself. The present invention, while providing for the transport of various articles to the beach further serves as a table and umbrella holder with out-of-sight storage at the beach. The present invention is further adapted to provide for transport of articles more specifically associated with the beach such as a cooler or ice chest, which the above-cited art does not provide. The present invention also is designed to transport a plurality of beach chairs, while the above-cited art carries only one.

From the teachings of U.S. Pat. No. 3,693,993 is known a beach tote cart, which provides for transport of various picnic and bathing articles to the beach and which at the beach can be used as a chair or cot. Such prior art has the disadvantage of not providing sufficient compartments and attaching frameworks specifically adapted to carry the articles needed by beachgoers. Once at the beach, this prior art serves as a chair and does not provide a table upon which items may be placed and does not continue to provide storage space. The present invention does provide a table and even when so deployed provides storage for various items, including paticularly storage out of sight for some smaller items.

A combined beach chair and shopping cart is disclosed in U.S. Pat. No. 3,758,128. Such cart again can be used to transport items to the beach, but has the same disadvantages of the prior art disclosed by U.S. Pat. No. 3,693,993, noted above. In addition, before it may be used as a chair, it is necessary to remove the wheels, a time-consuming and inconvenient activity obviated by the present invention.

U.S. Pat. No. 2,840,142 also teaches a foldable beach cart, which converts to a chair or pallet once at the beach. Again the disadvantages cited with regard to U.S. Pat. No. 3,693,993, are present and are not applicable to the present invention.

From the teachings of U.S. Pat. No. 4,316,615 is known a picnic beach cart which provides for transporting and storing at the beach chairs, an ice chest or cooler and other articles. Such cart has the disadvantages of not creating a table surface of sufficient size and convenient height at the beach, of requiring more than one person to pull to the beach and of not collapsing to a compact form when not in use. The present invention, by placement of wheels at either side of the caddy rather than under it, provides a convenient height for use as a table. The present invention also collapses into a compact form when not in use through the application of hinged sections and is transportable by one individual.

There is not known from prior art any beach caddy which provides for transport of the specific articles in the number and fashion of the present invention. There is also not known any beach caddy which serves as a table at the beach adapted to storage or holding of items in the number and fashion of the present invention. Finally, there is not known in the prior art any beach caddy which collapses in the form and to the shape of the present invention for storage and handling when not in use.

SUMMARY OF THE INVENTION

In accordance with the invention, the object of transport of umbrellas and fishing poles is achieved by a vertical frame having an upper horizontal cross-member with orifices of appropriate dimension through which the shafts of such umbrellas and fishing poles may be dropped and a lower horizontal cross-member upon which the bottom of such shafts can rest.

The object of transport of a cooler or ice chest is achieved by attaching a hinged platform for support of such cooler to the bottom of the vertical frame. The object of transport of beach chairs is achieved by attaching a hinged rack with a plurality of indentations for resting thereon the tubular or otherwise-shaped members of the frames for such chairs.

The object of providing a horizontal assembly of convenient height when the vertical frame is deployed in its horizontal table position upon the beach is achieved by placing the wheels of the caddy on either side of the vertical frame and by attaching a hinged leg assembly underneath the vertical frame of such size that, when fully deployed, it extends from the bottom of the vertical frame in the horizontal position the same distance as the bottom of the wheels extend from the bottom of the vertical frame.

The object of providing a flat surface for use as a table at the beach is achieved by attaching to the vertical frame a plurality of rectangular planar members spanning the distance from one vertical member of the vertical frame to the other vertical member. Some of such planar members have orifices of sufficient dimension to allow protrusion therethrough of the shafts of umbrellas and fishing poles and some have orifices of sufficient dimensions to allow protrusion therethrough without slippage of the insulating sleeves now commonly used to encompass standard cans of beverages thus achieving the object of holding in the horizontal table position, the umbrella, fishing poles and beverage cans.

The object of providing out-of-sight storage is achieved by placing between the upper and lower cross members a rear panel attached to the back of the vertical frame and providing a means of enclosing the front of the space so formed.

The object of ease of storage and handling of the caddy when not in use is achieved by hinging the upper portion of the vertical frame as well as the cooler platform, the chair rack, and the table leg assembly such that those elements may be compactly folded against the remainder of the vertical frame.

BRIEF DESCRIPTION OF THE DRAWINGS

In the drawings:

FIG. 1A is a view of the beach caddy taken along line 1A—1A in FIG. 1.

DESCRIPTION OF THE PREFERRED EMBODIMENTS

Figure 1:
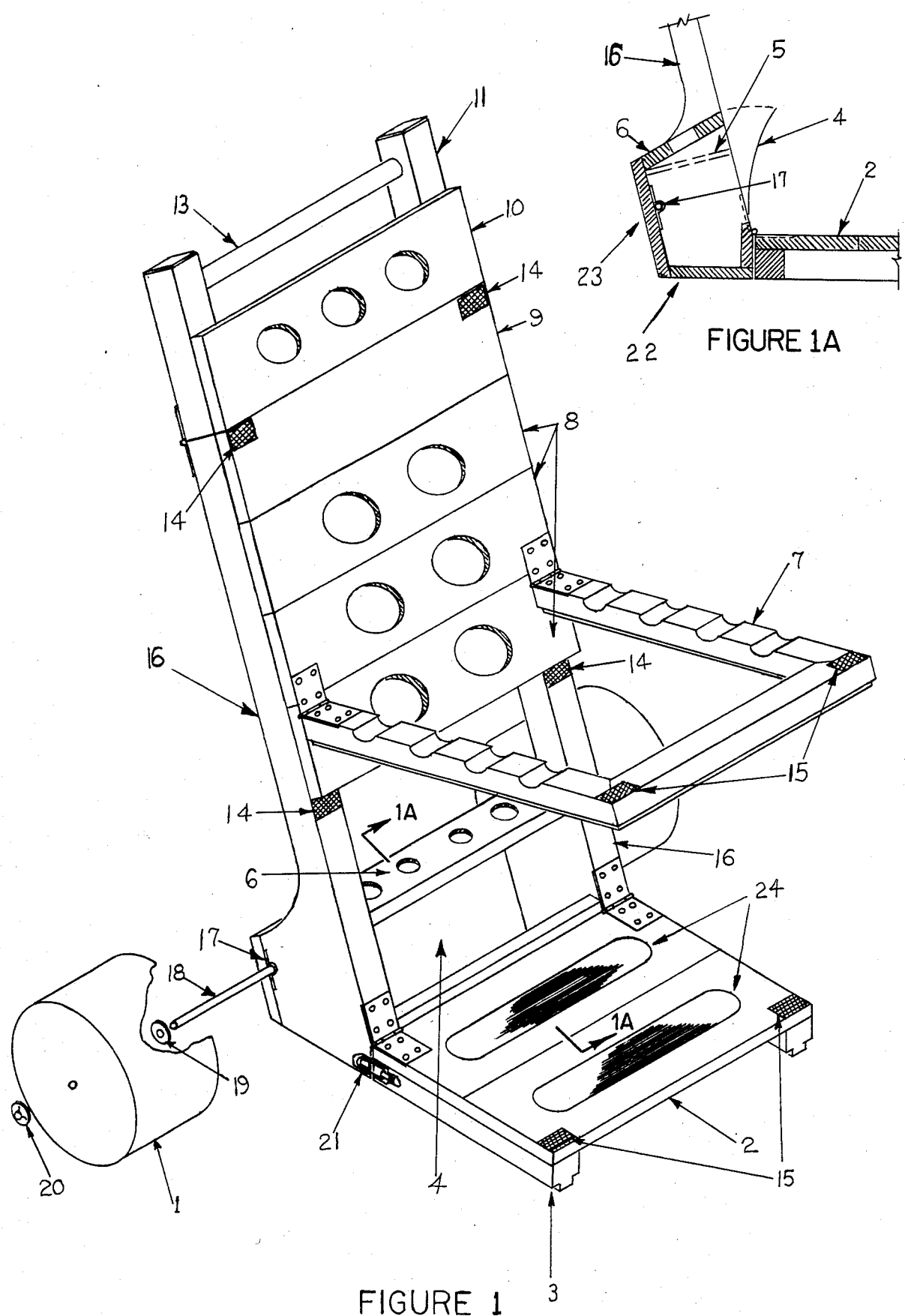
FIG. 1 shows the beach caddy in its upright carrier position.
Figure 2:
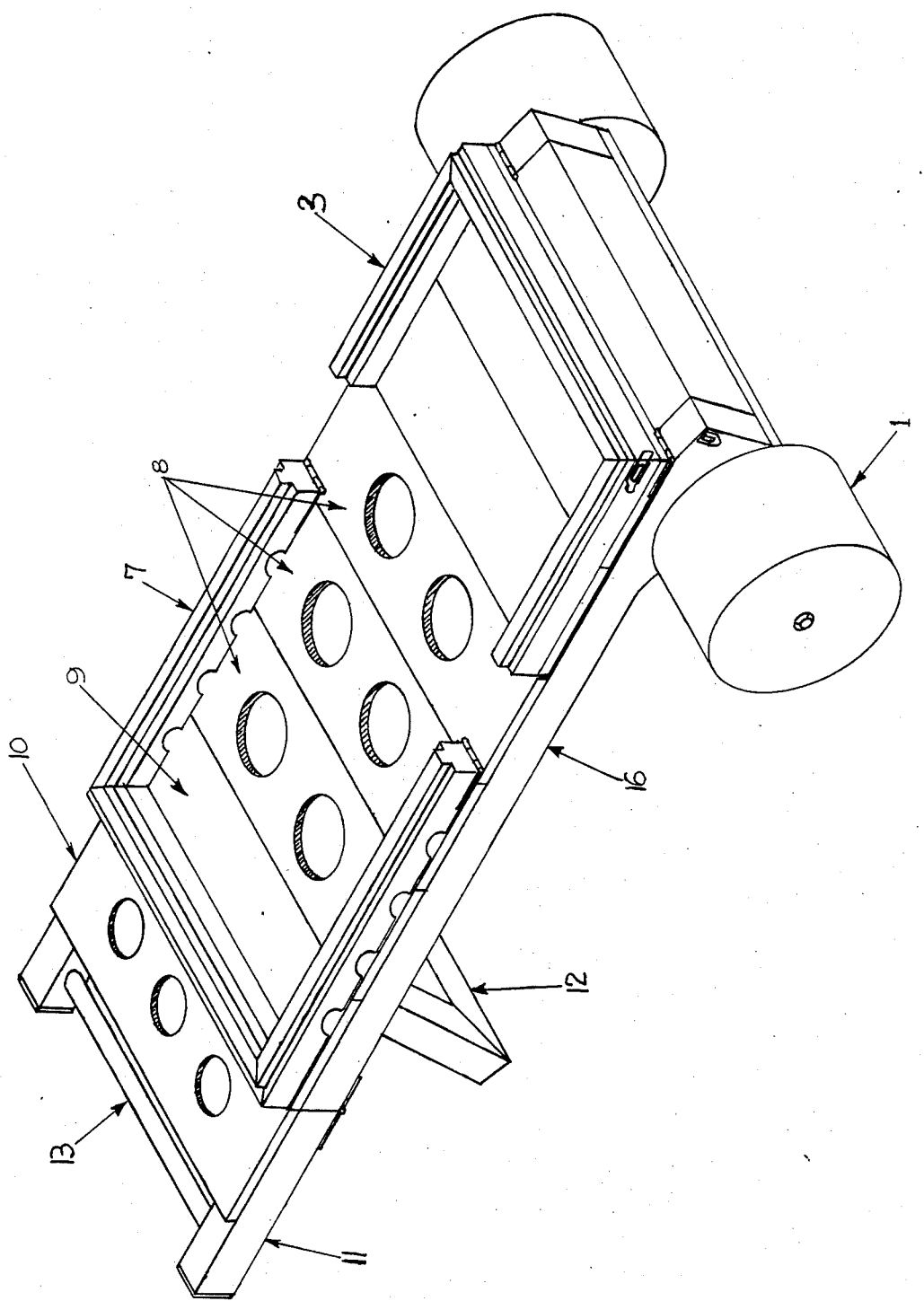
FIG. 2 shows the beach caddy in its horizontal table position.
Figure 3:
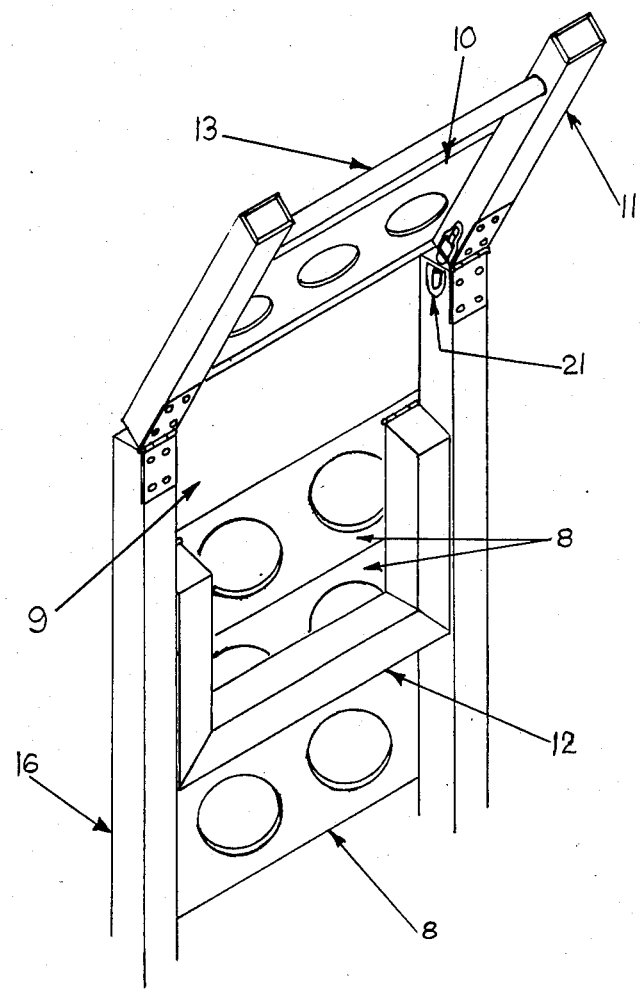
FIG. 3 shows a rear view of the upper portion of the beach caddy in its upright position with the upper portion partially folded.

The beach caddy is adapted to roll over sand and loose dirt by use of two wide wheels 1 each of which is attached to an axle 18 between a washer 19 and a hubcap 20. The axle 18 is connected to the remainder of the beach caddy by two axle brackets 17. The main portion of the beach caddy includes an upper vertical assembly with a horizontal bar 13 attached at either end to two upper vertical members 11, herein shown square in cross-section. To the front of the upper vertical members 11 is attached an upper table panel 10, having a plurality of circular orifices sized to receive standard beach umbrella and fishing poles, herein shown three in number. The entire upper vertical assembly is attached to a lower vertical assembly by hinges. The lower vertical assembly includes two lower vertical members 16, an upper cross-member 6 having a plurality of circular orifices, herein shown four in number, and a lower cross-member 22 connected at either end to the lower vertical members 16. To the front of the lower vertical members 16 are attached a plurality of lower table panels having circular orifices 8, which panels are herein shown three in number and each have orifices herein shown two in number sized to hold beverage cans without slipping. Above the upper most lower table panel with orifice 8, there is one or more lower table panel with no orifices 9, herein shown one in number. Between the upper cross-member 6 and the lower cross-member 22, and attached to the rear surface of each is a rear panel 23. Attached to the rear panel 23 there can be a plurality of dividers 5. In the front of the storage space created by the upper cross-member 6, the lower cross-member 22 and the rear panel 23 is a flexible front flap 4 which extends from the upper surface of the lower cross-member 22 to the upper surface of the upper cross-member 6 and from the inside surface of one lower vertical member 16 to the inside surface of the other lower vertical member 16. To the front of the lower vertical assembly is attached by hinges a block C-shaped chair rack 7 upon the arms of which are a plurality of grooves, herein shown four in number on each arm. Also attached by hinges to the front of the lower vertical assembly is a platform assembly including a block C-shaped platform frame 3 and one or more platform panels 2, herein shown two in number. Laminated to the top of each of the platform panels 2 is a surface of non-skid substance 24. On the upper outside corners of the upper most lower table panel 9 and on the front surface of the lower vertical members 16 immediately below the lower most lower table panel 8 are attached strips of hook and eye loop fastener 14. On the surface of the chair rack 7 which is on top when it is extended, on the outer most corners and on the surface of the platform assembly which is on top when it is extended, on the outer most corners, are attached the corresponding portions of the strips of hook and loop fastener 15. In addition, there is attached to the outside surface of one arm of the platform frame 3 and to the outside surface of the corresponding lower vertical member 16 is attached one of two sliding tongue latches 21. To the inside surface of one upper vertical member 11 and the inside surface of the corresponding lower vertical member 16 is attached the other of the two sliding tongue latches 21. To the rear surface of one of the upper table panels 8 is attached by hinges a block C-shaped leg frame 12.

I claim:

1. A beach caddy which comprises:
   a. An upper vertical frame assembly which comprises:
      i. two upper vertical members, approximately rectangular in cross-section;
      ii. a horizontal bar permanently attached at each end to the inside surface of each of the upper vertical members near the upper end of the upper vertical members; and
      iii. an upper table panel, rectangular in shape, of sufficient length to span from the outside surface of one of the upper vertical members to the outside surface of the other upper vertical member, having a plurality of circular orifices, permanently attached to the front surface of each of the upper vertical members such that the lower edge of the upper table panel is approximately flush with the lower end of each of the upper vertical members;
   b. a lower vertical frame assembly which comprises:
      i. two lower vertical members, approximately rectangular in cross-section and having at their upper end the same approximate dimensions as the upper vertical members, the rear surface of each connected at its upper end to the rear surface of the lower end of one of the upper vertical members by a hinge, each lower vertical member having a portion with increased depth near the lower end of such lower vertical member, and having a small notch on the back surface in the portion of increased depth;
      ii. an upper cross-member, rectangular in shape, permanently attached at each end to the inside surface of one of the lower vertical members at a point between the upper and the lower end of the lower vertical members and having a width approximately equal to the depth of the lower vertical member at the point of juncture of the two;
      iii. a lower cross-member, rectangular in shape, permanently attached at each end to the inside surface of one of the lower vertical members such that the bottom of the lower cross-member is approximately flush with the lower end of each of the lower vertical members and having width approximately equal to the depth of the lower vertical member at the point of the juncture of the two;
      iv. a rear panel, rectangular in shape, permanently attached to the back surface of the lower vertical members near the lower ends of the lower vertical members, the top edge of which is approximately flush with the top surface of the upper horizontal planar member and the lower edge of which is approximately flush with the lower end of the lower vertical members;
      v. a means of enclosing the front of the storage space created by the inside surfaces of the upper cross-member, the rear panel, the lower cross-member and the lower vertical members;

vi. two axle brackets, one of which is attached to the front surface of the rear panel at either outside end such that the outside edge of each of the axle brackets is approximately flush with the outside end of the rear panel at the point of the small notch in each of the lower vertical members;

vii. an axle passing through both of the axle brackets;

viii. two wheels, one attached to each end of the axle outside the lower vertical members;

ix. one or more lower table panels, rectangular in shape, of sufficient length to span from the outside surface of one of the lower vertical members to the outside surface of the other lower vertical member, one or more of which having a plurality of circular orifices, permanently attached to the front surface of each of the lower vertical members such that the upper edge of the top most of the lower table panels is approximately flush with the upper end of each of the lower vertical members and each other lower table panel is located approximately adjacent to and flush with the lower table panel above it, if there is more than one lower table panel;

c. a block-C shaped chair rack the arms of which are connected to the front of the lower vertical frame assembly by hinges approximately at the midpoint in the vertical direction of the lower vertical frame assembly and upon the top of which arms are a plurality of grooves;

d. a platform assembly which comprises:

i. one or more platform panels, approximately rectangular in shape, of sufficient length to span from the outside surface of one of the lower vertical members to the outside surface of the other lower vertical member, the upper surface of the inner most platform panel being attached to each of the lower vertical members by hinges near the lower end of the lower vertical members, and having a total dimension from the rear edge of the inner most platform panel to the front edge of the outer most platform panel such that when folded against the lower vertical frame the front edge of the outer most platform panel is approximately adjacent to and flush with the lower most lower table panel; and ii. a block-C shaped platform frame, the open end of which faces away from the lower vertical frame assembly and the two arms of which are permanently attached to the bottom surface of each of the platform panels such that the outside edge of each arm is approximately flush with the outside edge of the platform panels, such platform frame extending approximately to the front edge of the outer most platform panel;

e. a block-C shaped leg frame connected to the back of the lower vertical frame assembly by hinges.

2. A beach caddy as recited in claim 1, further comprising:

a. a means of locking the platform assembly in a horizontal position when the upper and lower vertical frame assemblies are in a vertical position;

b. a means of locking the upper vertical frame assembly to the lower vertical frame assembly in a fully extended vertical position;

c. a means of locking the chair rack in a folded position; and d. a means of locking a platform assembly in the folded position.

3. A beach caddy as recited in claim 2 wherein;

a. the means of locking the platform assembly in the horizontal position is a sliding tongue latch, one portion of which is attached to one of the outside edges of the inner most platform panel approximately flush with the rear edge of such platform panel and the corresponding portion of which is attached to the outside surface of the vertical frame assembly such that the two portions join when the platform assembly is fully extended horizontally;

b. the means of locking, the upper vertical frame assembly to the lower vertical frame assembly is a sliding tongue latch, one portion of which is attached to the outside edge of one of the upper vertical members, approximately flush with the lower end of such upper vertical member, and the corresponding upper vertical member is connected such that the two portions join when the upper vertical frame assembly is fully extended;

c. the means of locking the chair rack in the folded position is a strip of hook and loop fastener, one portion of which is attached to the upper surface of the outer corners of the arms of the chair rack and the corresponding portion of which is attached to the front surface of the lower vertical frame assembly at the point where the outer corner of the arms of the chair rack rest when the chair rack is folded against the lower vertical frame assembly;

d. the means of locking the platform assembly in the folded position is a strip of hook and loop fastener, one portion of which is attached to the upper surface of the outer corners of the outer most platform panel and the corresponding portion of which is attached to the front surface of each of the lower vertical members at the point where the outer corners of the outer most plaform panel rests when the platform assembly is folded against the lower vertical frame assembly; and e. the means of enclosing the storage space is a flap of flexible material permanently attached to the lower cross-member near the front of the lower cross member of sufficient length to extend from on lower vertical member to the other.

4. A beach caddy as recited in claim 3 further comprising:

a. one or more surfaces of non-skid substance laminated to the top of a portion of one or more of the platform panels;

b. one or more dividers attached at one end to the rear panel and extending in a direction parallel to the inside surface of the lower vertical members to a point at or near the means of enclosing the storage space.

5. A beach caddy as recited in claim 3, wherein:

a. the upper table panel has three orifices of sufficient diameter to hold the shafts of beach umbrellas and fishing poles;

b. the lower table panels number four and the lower three lower table panels each have two orifices which are of sufficient diameter to hold without slippage a standard insulated sleeve for beverage cans;

c. the platform panels number two; and d. the grooves in each arm of the chair rack number four.

* * * * *